(12) United States Patent
Wu et al.

(10) Patent No.: US 8,684,378 B2
(45) Date of Patent: Apr. 1, 2014

(54) FRAME FOLDING AND ADJUSTMENT MECHANISM AND FOLDABLE MOTORIZED VEHICLE HAVING SAME

(75) Inventors: Chichun Wu, Dongguan (CN); Zhao Zhang, Dongguan (CN)

(73) Assignee: Dongguan Prestige Sporting Products Co. Ltd, Dongguan (CN)

( * ) Notice: Subject to any disclaimer, the term of this patent is extended or adjusted under 35 U.S.C. 154(b) by 172 days.

(21) Appl. No.: 13/357,194

(22) Filed: Jan. 24, 2012

(65) Prior Publication Data

US 2012/0193943 A1 Aug. 2, 2012

(30) Foreign Application Priority Data

Jan. 28, 2011 (CN) .................. 2011 2 0029827 U
Jan. 28, 2011 (CN) .................. 2011 2 0029857 U
Mar. 21, 2011 (CN) .................. 2011 2 0074814 U

(51) Int. Cl.
*B62M 27/02* (2006.01)

(52) U.S. Cl.
USPC .................... 280/87.05; 180/214

(58) Field of Classification Search
USPC ................... 280/87.05; 180/214
See application file for complete search history.

(56) References Cited

U.S. PATENT DOCUMENTS

| | | | | |
|---|---|---|---|---|
| 6,173,976 B1 * | 1/2001 | Lee | ............... | 280/87.05 |
| 6,182,988 B1 * | 2/2001 | Wu | ............... | 280/87.05 |
| 6,234,501 B1 * | 5/2001 | Chen | ............... | 280/87.041 |
| 6,270,095 B1 * | 8/2001 | Chang | ............... | 280/87.041 |
| 6,276,701 B1 * | 8/2001 | Chen | ............... | 280/87.05 |
| 6,286,845 B1 * | 9/2001 | Lin | ............... | 280/87.05 |
| 6,332,621 B1 * | 12/2001 | Wu | ............... | 280/87.041 |
| 6,378,880 B1 * | 4/2002 | Lin | ............... | 280/87.05 |
| 6,390,483 B1 * | 5/2002 | Hsu et al. | ............... | 280/87.041 |
| 6,428,021 B1 * | 8/2002 | Tung | ............... | 280/87.041 |
| 6,481,913 B2 * | 11/2002 | Chen | ............... | 403/83 |
| 6,848,697 B2 * | 2/2005 | Lan | ............... | 280/87.05 |
| 6,866,275 B1 * | 3/2005 | Puzey | ............... | 280/87.05 |
| 6,880,840 B2 * | 4/2005 | Chuang | ............... | 280/87.041 |
| 7,011,319 B2 * | 3/2006 | Lu | ............... | 280/87.041 |
| 7,156,405 B1 * | 1/2007 | Ming | ............... | 280/87.05 |
| 7,407,172 B2 * | 8/2008 | Ka Ming | ............... | 280/87.041 |
| 7,419,171 B1 * | 9/2008 | Ka Ming | ............... | 280/87.041 |
| 7,559,561 B2 * | 7/2009 | Tsai | ............... | 280/87.05 |
| 8,113,525 B2 * | 2/2012 | Lin | ............... | 280/87.041 |
| 8,474,840 B2 * | 7/2013 | Tsai | ............... | 280/87.05 |
| 2002/0050696 A1 * | 5/2002 | Lan | ............... | 280/87.041 |
| 2002/0145264 A1 * | 10/2002 | Hung | ............... | 280/87.041 |

(Continued)

*Primary Examiner* — Jeffrey J Restifo
(74) *Attorney, Agent, or Firm* — Morris Manning & Martin LLP; Tim Tingkang Xia, Esq.

(57) ABSTRACT

A frame folding and adjustment mechanism for a foldable motorized vehicle, comprising: a hollow adjusting and fixing member, a hollow mounting member, an elastic element, a restricting member, and a cable assembly having a fixing cylinder, and a cable, wherein the fixing cylinder is fixed between the front rack and the hollow mounting member, the upper end of the cable freely passes through the fixing cylinder, the lower end of the cable fixedly passes through the restricting member and is connected to a lower end of the elastic element, the upper end of the elastic element is fixed to the hollow mounting member, the restricting member detaches from the hollow adjusting and fixing member when the upper end of the cable is pulled, and the restricting member engages with the edges of the hollow adjusting and fixing member when the upper end of the cable is released.

10 Claims, 13 Drawing Sheets

(56) References Cited

U.S. PATENT DOCUMENTS

2003/0214108 A1* 11/2003 Lan .......................... 280/87.05
2005/0073121 A1* 4/2005 Chen ......................... 280/87.05
2006/0103096 A1* 5/2006 Chen ......................... 280/87.05
2006/0237934 A1* 10/2006 Tsai .......................... 280/87.05

* cited by examiner

FRAME FOLDING AND ADJUSTMENT MECHANISM AND FOLDABLE MOTORIZED VEHICLE HAVING SAME

CROSS-REFERENCE TO RELATED APPLICATIONS

This application claims priority to and benefit of, pursuant to 35 U.S.C. §119(a), Chinese Patent Application No. 201120029857.8, filed Jan. 28, 2011, Chinese Patent Application No. 201120029827.7, filed Jan. 28, 2011, and Chinese Patent Application No. 201120074814.1, filed Mar. 21, 2011, the disclosures of which are incorporated herein by reference in their entireties.

FIELD OF THE PRESENT INVENTION

The present invention relates to a folding and adjustment mechanism of a foldable motorized vehicle, in particular, to a frame folding and adjustment mechanism mounted between front wheels and a front wheel stem of a foldable motorized vehicle.

BACKGROUND OF THE PRESENT INVENTION

In order to save storage space and be convenient to carry, currently, bicycles, electric bicycles, and motorized vehicle are mostly foldable. Therefore, to meet various requirements on folding, diversified folding and adjustment mechanisms are designed on the bicycles, electric bicycles and motorized vehicle. Usually, a foldable motorized vehicle has a large front wheel rack, and therefore, a folding mechanism is generally mounted at a connection point between the front wheel rack and a body rack, so that the front rack can be folded. In the current folding mechanism, a mounting seat is mounted first, an arc-shaped sliding slot is opened in the mounting seat, the front wheel rack is pivoted to the mounting seat, and the front wheel rack is fixed at different angles of the sliding slot by using a quick release device, thereby realizing the purpose of angle adjustment and folding. By using this structure, the front wheel rack may be folded completely; however, the quick release device is mounted at a lower part of the front wheel rack, and the angle can be adjusted only after a user gets off and opens the quick release device. Therefore, the operation is rather inconvenient. Moreover, the mounting seat and the quick release device are both mounted external to the foldable motorized vehicle, and are totally exposed to the outside in use, which has certain impact on the appearance of the foldable motorized vehicle.

Therefore, a heretofore unaddressed need exists in the art to address the aforementioned deficiencies and inadequacies.

SUMMARY OF THE PRESENT INVENTION

In one aspect, the present invention relates to a frame folding and adjustment mechanism. The frame folding and adjustment mechanism is mounted between a front rack and a body rack of a foldable motorized vehicle to enable the front rack to be adjustable and foldable relative to the body rack. The frame folding and adjustment mechanism includes: (a) a hollow adjusting and fixing member, (b) a hollow mounting member, (c) an elastic element, (d) a restricting member, and (e) a cable assembly.

In one embodiment, the hollow adjusting and fixing member is mounted to the body rack, and it has two pivot holes, one on each side. The hollow mounting member has an upper end and a lower end. The upper end of the hollow mounting member is disposed in the hollow adjusting and fixing member and is pivoted through the pivot holes to the hollow adjusting and fixing member. The lower end of the hollow mounting member is formed with one slide slot on each side. The elastic element is mounted on the hollow mounting member. The restricting member is vertically slideably mounted in the two slide slots on each side and engaging with the edges of the hollow adjusting and fixing member. The cable assembly has a fixing cylinder, and a cable. The fixing cylinder is fixed between the front rack and the hollow mounting member. The cable has an upper end and a lower end. The upper end of the cable freely passes through the fixing cylinder. The lower end of the cable fixedly passes through the restricting member and is connected to the lower end of the elastic element. The upper end of the elastic element is fixed to the hollow mounting member. The restricting member detaches from the hollow adjusting and fixing member when the upper end of the cable is pulled, and the restricting member engages with the edges of the hollow adjusting and fixing member when the upper end of the cable is released.

In one embodiment, the cable assembly further has a guide pipe, and a connecting handle. The guide pipe is inserted and fixed in the fixing cylinder. The upper end of the cable freely passes through the guide pipe and is fixedly connected to the connecting handle. The connecting handle is mounted above the guide pipe.

In one embodiment, the hollow mounting member has a pivot shaft. The pivot shaft is fixed to the upper end of the hollow mounting member and is mounted in the pivot holes. The upper end of the elastic element is connected to the pivot shaft. The elastic element is a tension spring. The frame folding and adjustment mechanism also includes a cable restricting plate. The cable restricting plate is fixed to a bottom portion of the lower end of the hollow mounting member. The middle portion of the cable restricting plate is formed with a restricting hole for the cable to pass through, and the restricting hole is aligned with the axis of the elastic element. The hollow adjusting and fixing member has a fan-shaped structure.

In one embodiment, the upper surface of the restricting member is formed with locking teeth. The arc-shaped edge of the fan-shaped structure of the hollow adjusting and fixing member is formed with adjusting teeth engaging with the locking teeth. The left end of the arc-shaped edge of the fan-shaped structure of the hollow adjusting and fixing member is formed with a restricting slot for fastening the restricting member. The hollow adjusting and fixing member has a fan-shaped angle about 90°.

In another aspect, the present invention relates to a frame folding and adjustment mechanism. The frame folding and adjustment mechanism is mounted between a front rack and a body rack of a foldable motorized vehicle to enable the front rack to be adjustable and foldable relative to the body rack. In one embodiment, the frame folding and adjustment mechanism includes: (a) a connecting member, (b) a connecting rod, (c) a sliding block, (d) two steel balls, (e) a spring, and (f) a cable.

In one embodiment, the connecting member is hollow and slidingly mounted in the body rack. The connecting member is opened with through holes on each side of two side walls. The body rack is provided with locking holes corresponding to the through holes on both sides. The connecting rod has two ends. The first end is pivoted to the front rack, and the second end is pivoted to the connecting member. The sliding block, is slidingly mounted in the connecting member. The sliding block is provided with step-like accommodation slots corresponding to the through holes respectively on each of the two sides. The sliding block also has a cable slit along a front direction of the front rack, and a connecting hole in communication with the cable slit. The two steel balls, one on each side are accommodated in the accommodation slot, and the other side passing through the through holes and being engaged with the locking holes. The spring presses between a pressing plate of the connecting member and the sliding block. The cable has two ends. The first end is inserted in the connecting hole and clamped in the cable slit such that it is connected to the sliding block. The second end passes through the cable slit and the spring and is connected to a cable controller of a handle of the foldable motorized vehicle.

In one embodiment, the connecting member has two connecting pieces extended at two sides thereof along a direction of the front rack. The connecting pieces are pivoted to the connecting rod. The accommodation slot has an arc-shaped cross section. The connecting hole of the sliding block is in communication with the cable slit, and a head of the cable is inserted in the connecting hole and clamped in the cable slit.

In yet another aspect, the present invention relates to a foldable motorized vehicle. The foldable motorized vehicle has a front rack, a body rack and a frame folding and adjustment mechanism, mounted between the front rack and the body rack to enable the front rack to be adjustable and foldable relative to the body rack. The frame folding and adjustment mechanism in one embodiment comprises a hollow adjusting and fixing member, mounted to the body rack, having two pivot holes, one on each side, a hollow mounting member, wherein an upper end of the hollow mounting member is disposed in the hollow adjusting and fixing member and is pivoted through the pivot holes to the hollow adjusting and fixing member, and a lower end of the hollow mounting member is formed with one slide slot on each side, an elastic element, mounted on the hollow mounting member, a restricting member, vertically slideably mounted in the two slide slots on each side and engaging with the edges of the hollow adjusting and fixing member, and a cable assembly, comprising a fixing cylinder, and a cable, wherein the fixing cylinder is fixed between the front rack and the hollow mounting member, an upper end of the cable freely passes through the fixing cylinder, a lower end of the cable fixedly passes through the restricting member and is connected to a lower end of the elastic element, an upper end of the elastic element is fixed to the hollow mounting member, the restricting member detaches from the hollow adjusting and fixing member when the upper end of the cable is pulled, and the restricting member engages with the edges of the hollow adjusting and fixing member when the upper end of the cable is released.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
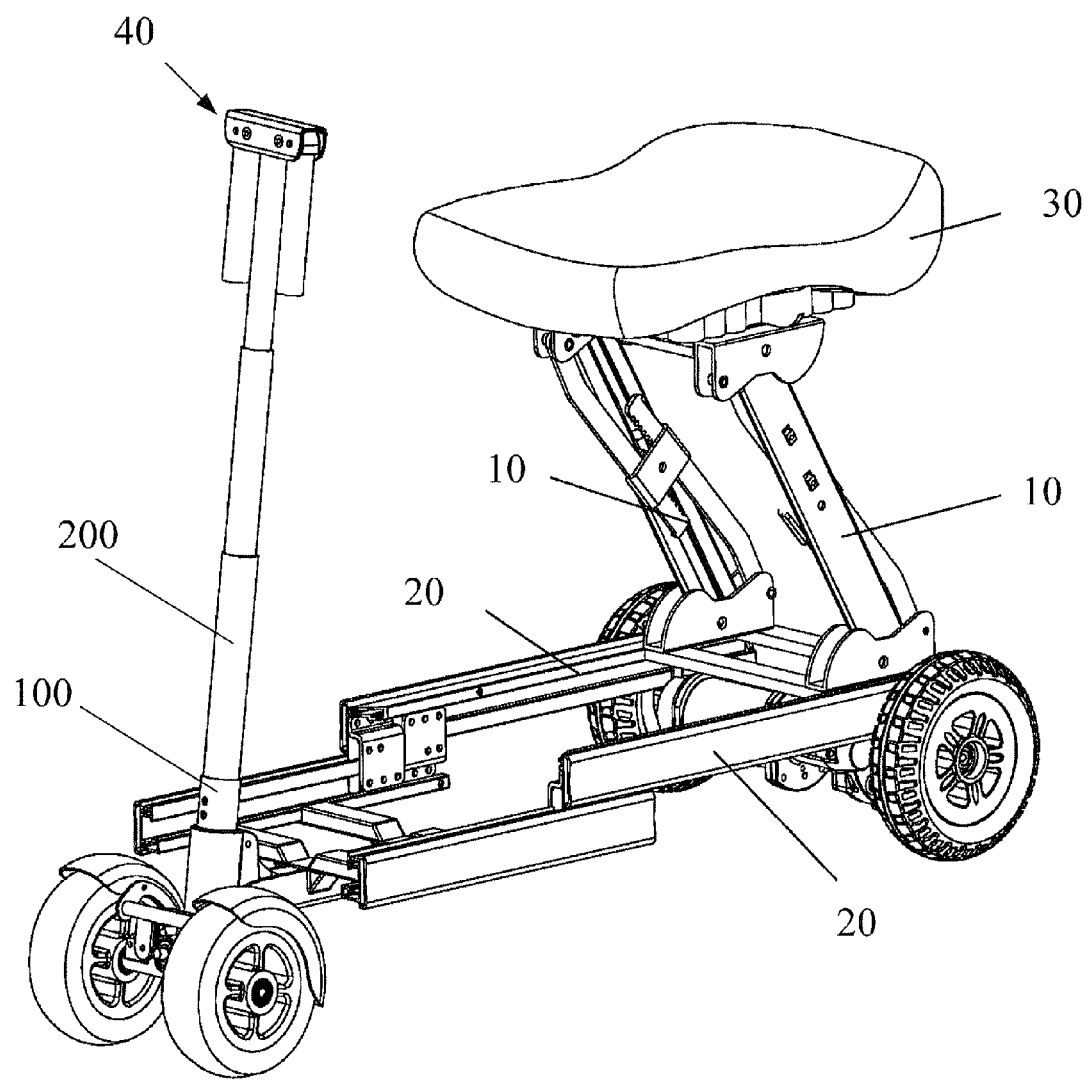
FIG. 1 is an abbreviated perspective view of a foldable motorized vehicle according one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

Referring now to FIG. 1, an abbreviated perspective view of a foldable motorized vehicle is shown according one embodiment of the present invention. The foldable motorized vehicle has: (a) a foldable frame body 20, (b) a foldable seat mounting rack 10, (c) a seat 30, (d) a frame folding and adjustment mechanism 100, and (e) handlebar folding mechanism 40 with two foldable handlebars, and a steering axial rod 200. As it is shown in FIG. 1, the seat, the frame body, and steering are all foldable so that the entire vehicle is foldable to save storage space.

Figure 2:
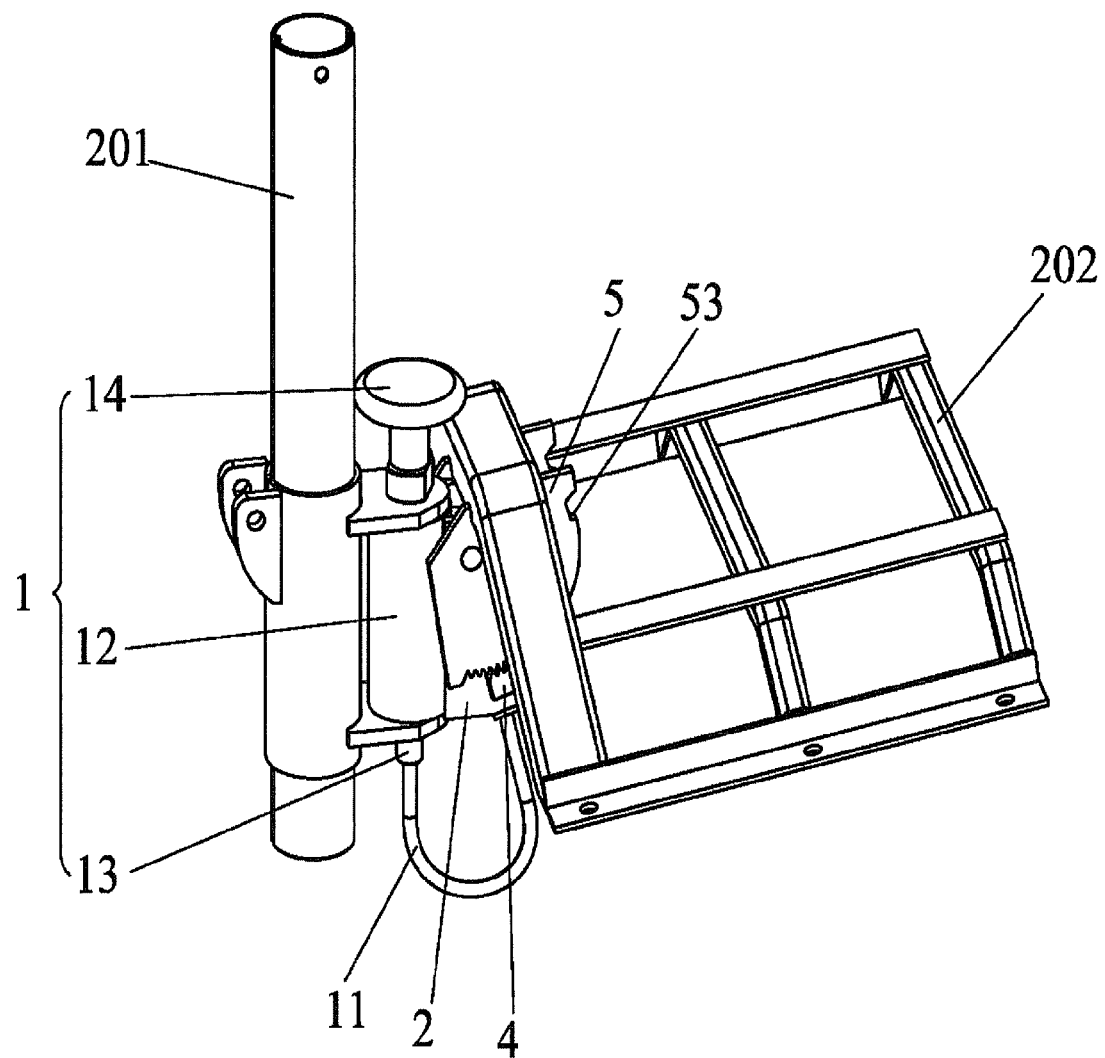
FIG. 2 is an perspective view of an frame folding and adjustment mechanism according to one embodiment of the present invention.
Figure 3:
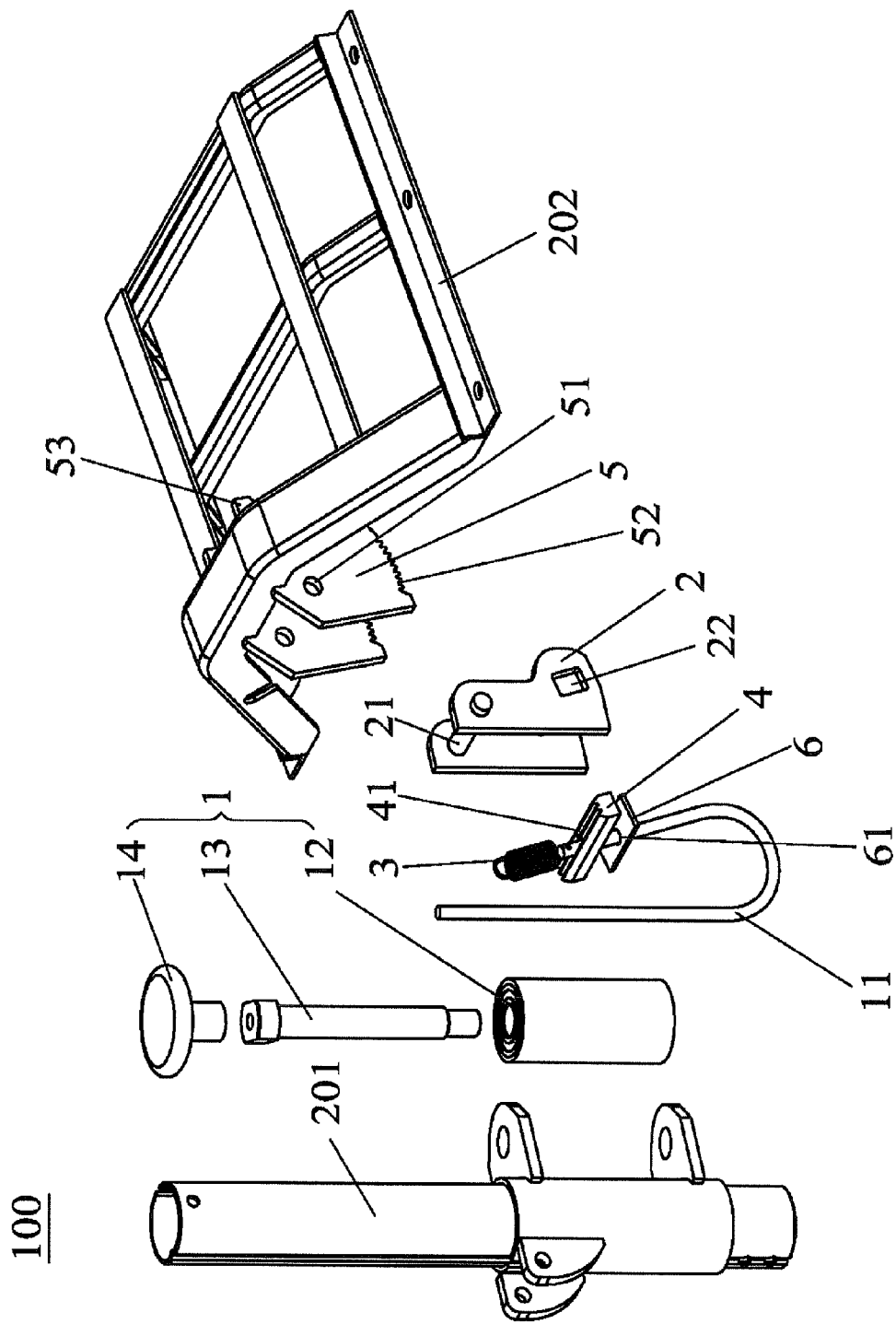
FIG. 3 is an exploded perspective view of the frame folding and adjustment mechanism according to one embodiment of the present invention.
Figure 4:
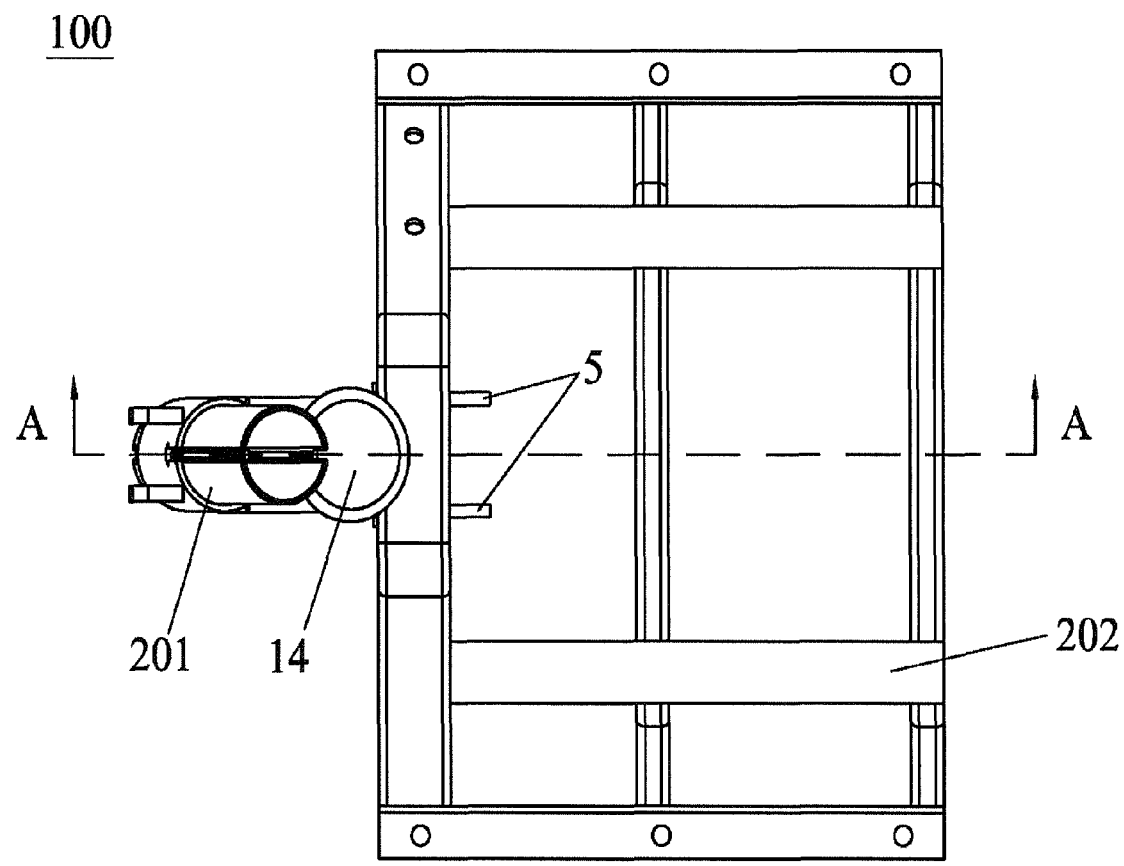
FIG. 4 is a top view of the frame folding and adjustment mechanism according to one embodiment of the present invention.
Figure 5:
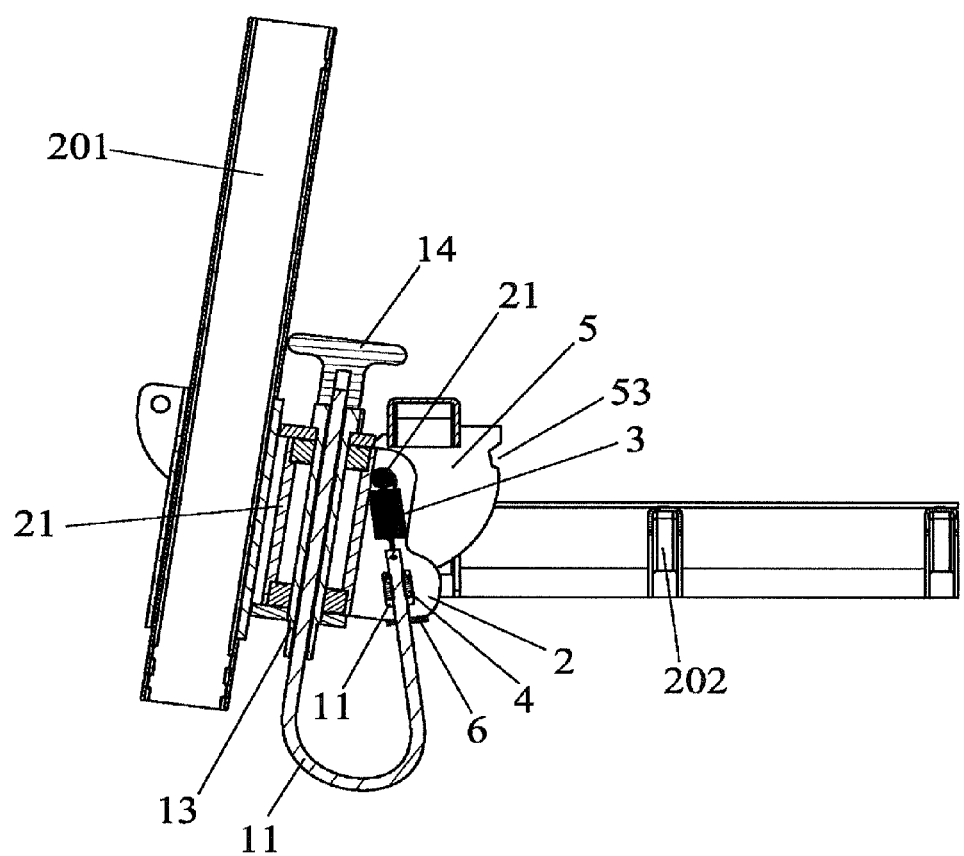
FIG. 5 is a sectional view of the frame folding and adjustment mechanism along an A-A direction as shown in FIG. 4 according to one embodiment of the present invention.

FIG. 2 offers a closer and detailed perspective view of the frame folding and adjustment mechanism 100 according to one embodiment of the present invention. Referring now to FIG. 3, an exploded perspective view of the frame folding and adjustment mechanism 100 is shown according to one embodiment of the present invention. In one embodiment, the frame folding and adjustment mechanism 100 is mounted between a front rack and a body rack of a foldable motorized vehicle to enable the front rack to be adjustable and foldable relative to the body rack. The frame folding and adjustment mechanism includes: (a) a hollow adjusting and fixing member, (b) a hollow mounting member, (c) an elastic element, (d) a restricting member, and (e) a cable assembly. In one embodiment, the hollow adjusting and fixing member 5 is mounted to the body rack 202. The hollow adjusting and fixing member 5 has two symmetric pieces, one on each side. Each piece of the hollow adjusting and fixing member 5 has one pivot hole 51, an arc-shaped edge of the fan-shaped structure with locking teeth 52, and a restricting slot 53. The hollow mounting member 2 has an upper end and a lower end, and two symmetric pieces connected by a pivot shaft 21. The upper end of the hollow mounting member 2 is disposed in the hollow adjusting and fixing member 5 and is pivoted through the pivoting holes 51 with the pivot shaft 21 to the hollow adjusting and fixing member 5, and a lower end of the hollow mounting member 2 is formed with one slide slot on each side. The elastic element 3 is a tension spring and it is mounted on the hollow mounting member 2. The restricting member 4 is vertically slideably mounted in the two slide slots 22 on each side and engaging with the edges of the hollow adjusting and fixing member 5. The cable assembly 1 has a fixing cylinder 12, and a cable 11. The fixing cylinder 12 is fixed between the front rack 201 and the hollow mounting member 2. The upper end of the cable freely passes through the fixing cylinder 12. The lower end of the cable fixedly passes through the restricting member 4 and is connected to the lower end of the elastic element 3. The upper end of the elastic element 3 is fixed to the hollow mounting member 2. The restricting member 4 detaches from the hollow adjusting and fixing member 5 when the upper end of the cable is pulled, and the restricting member 4 engages with the edges of the hollow adjusting and fixing member 5 when the upper end of the cable 11 is released.

In one embodiment, the cable assembly 1 has a guide pipe 13, and a connecting handle 14. The guide pipe 13 is inserted and fixed in the fixing cylinder 12. The upper end of the cable 11 freely passes through the guide pipe 13 and is fixedly connected to the connecting handle 14. The connecting handle 14 is mounted above the guide pipe 13.

In one embodiment, the frame folding and adjustment mechanism 100 also has a cable restricting plate 6. The cable restricting plate 6 is fixed to a bottom portion of the lower end of the hollow mounting member 2. The middle portion of the cable restricting plate 6 is formed with a restricting hole 61 for the cable to pass through. The restricting hole 61 is aligned with the axis of the elastic element 3.

In one embodiment, the upper surface of the restricting member 4 is formed with locking teeth 41, and the arc-shaped edge of the fan-shaped structure of the hollow adjusting and fixing member 5 is formed with adjusting teeth 52 engaging with the locking teeth 41. The rear end of the arc-shaped edge of the fan-shaped structure of the hollow adjusting and fixing member 5 is formed with a restricting slot 53 for fastening the restricting member 4. The hollow adjusting and fixing member 5 has a fan-shaped angle about 90°.

As shown in FIG. 2 through FIG. 5, the upper side of the adjusting and fixing member 5 is fastened and fixed to the body rack 202. The upper end of the hollow mounting member 2 is disposed in the hollow adjusting and fixing member 5 with the pivot shaft 21 going through the pivot holes 51 on each side. The lower end of the hollow mounting member 2 is formed with a slide slot 22. The restricting member 4 is vertically slideably mounted in the slide slot 22 and has two ends protruding from two sides of the hollow mounting member 2 and engaging with an edge of the hollow adjusting and fixing member 5. The lower end of the cable 11 fixedly passes through the restricting member 4 and is connected to a lower end of the tension spring 3. The tension spring 3 is accommodated in the hollow mounting member 2. The upper end of the tension spring 3 is fixed to the pivot shaft 21. The resilient force of the tension spring 3 enables the cable 11 to restore to its original state after being stretched. The restricting member 4 is formed with locking teeth 41. The arc-shaped edge of the fan-shaped structure of the hollow adjusting and fixing member 5 is formed with adjusting teeth 52 engaging with the locking teeth 41. The rear end of the arc-shaped edge of the fan-shaped structure of the hollow adjusting and fixing member 5 is formed with a restricting slot 53 for receiving the restricting member 4. As the adjusting teeth 52 engage with the locking teeth 41, the rotation of the hollow mounting member 2 is restricted, thereby locking the hollow mounting member 2.

Moreover, locking at different angles can be achieved through the engagement of different adjusting teeth 52 with the locking teeth 41, thereby achieving angle adjustment and locking The restricting slot 53 fastens the restricting member 4, thereby locking the hollow mounting member 2 in a folded state. The cable restricting plate 6 is fixed to a bottom portion of the lower end of the hollow mounting member 2, a middle portion of the cable restricting plate 6 is formed with a restricting hole 61 for the cable 11 to pass through, and the restricting hole is aligned with an axis of the tension spring. The restricting hole 61 can restrict the position of the cable 11, so that a direction in which the cable 11 draws the restricting member 4 is always consistent with an extension-retraction direction of the tension spring 3.

Figure 6:
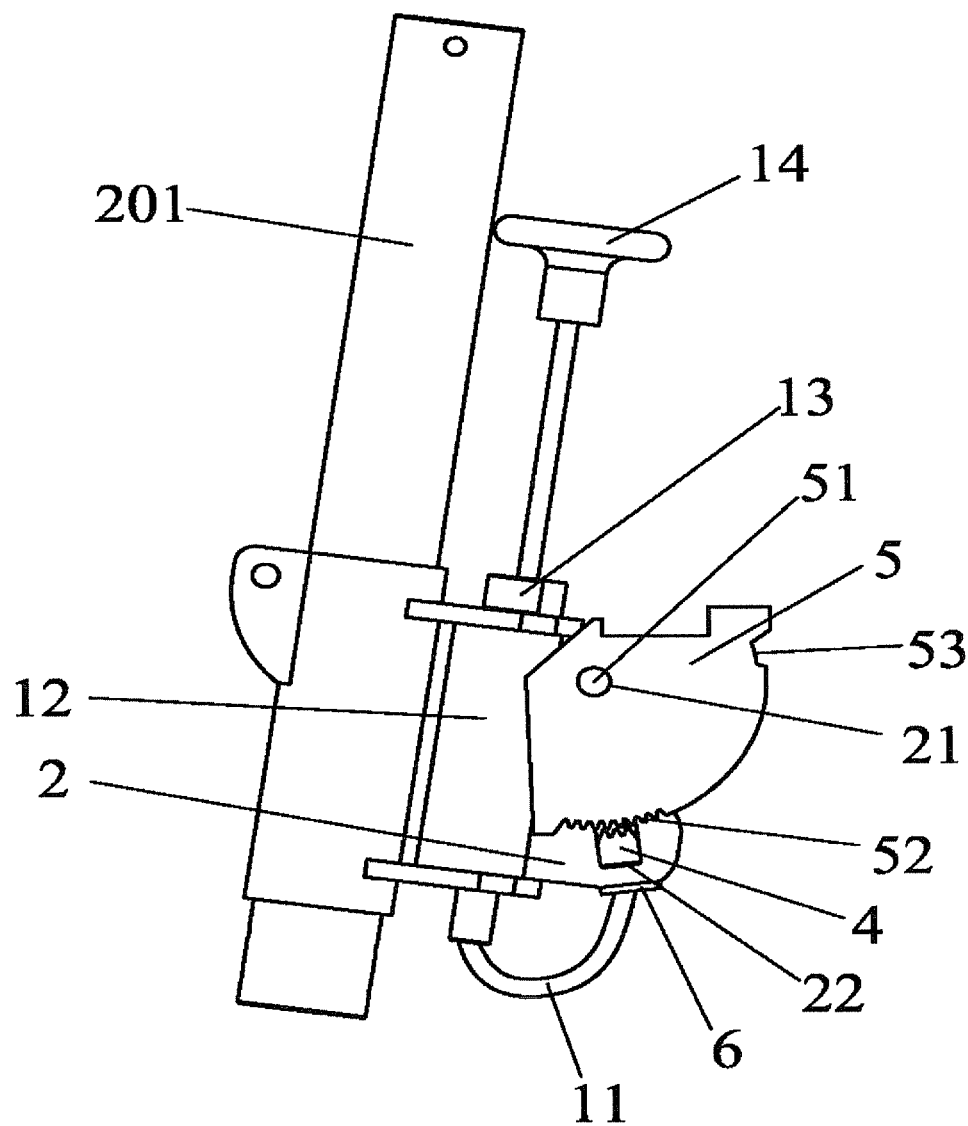
FIG. 6 is a side view of the frame folding and adjustment mechanism when a restricting member is in an unlocked state according to one embodiment of the present invention.
Figure 7:
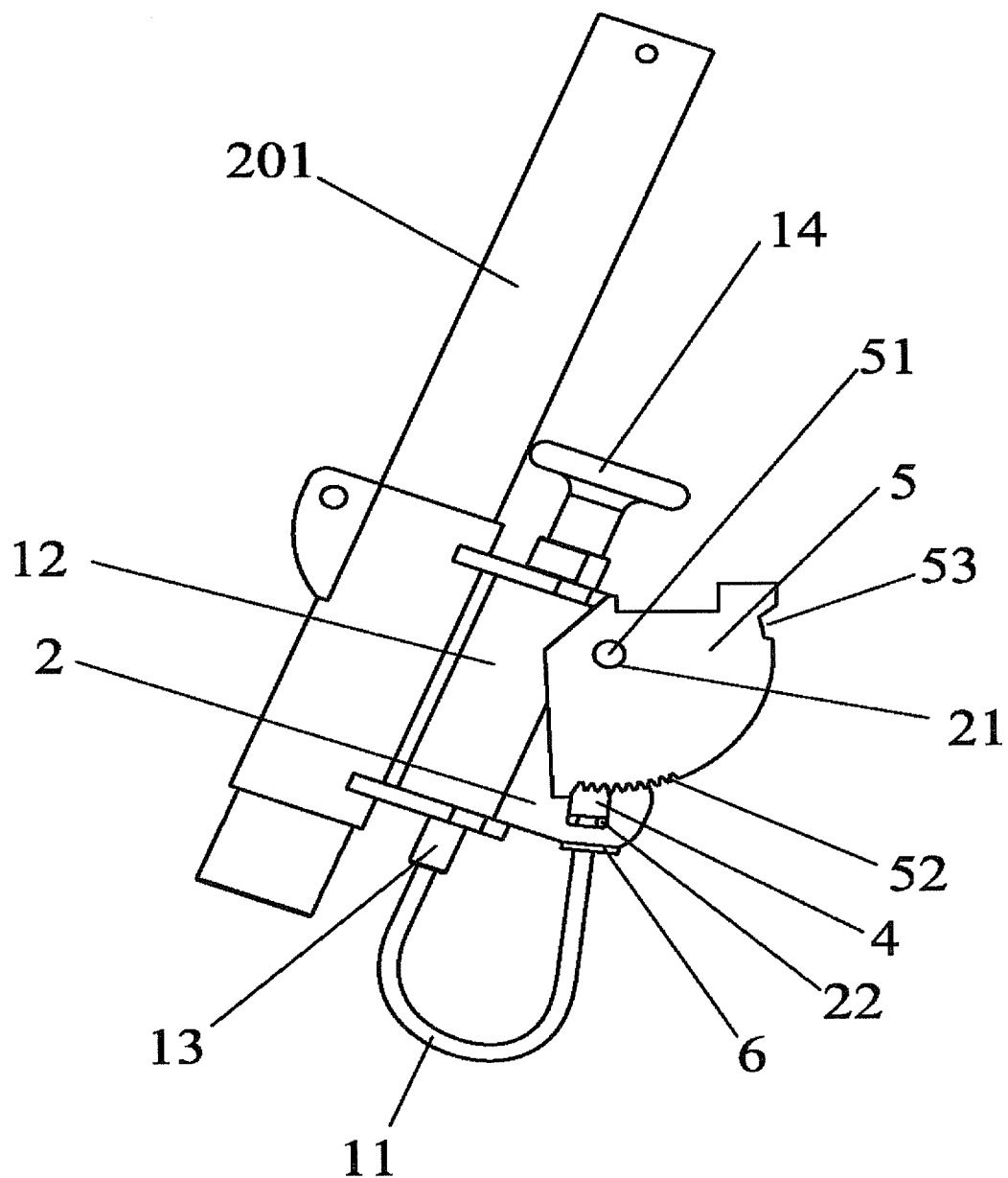
FIG. 7 is a side view of the frame folding and adjustment mechanism after angle adjustment according to one embodiment of the present invention.
Figure 8:
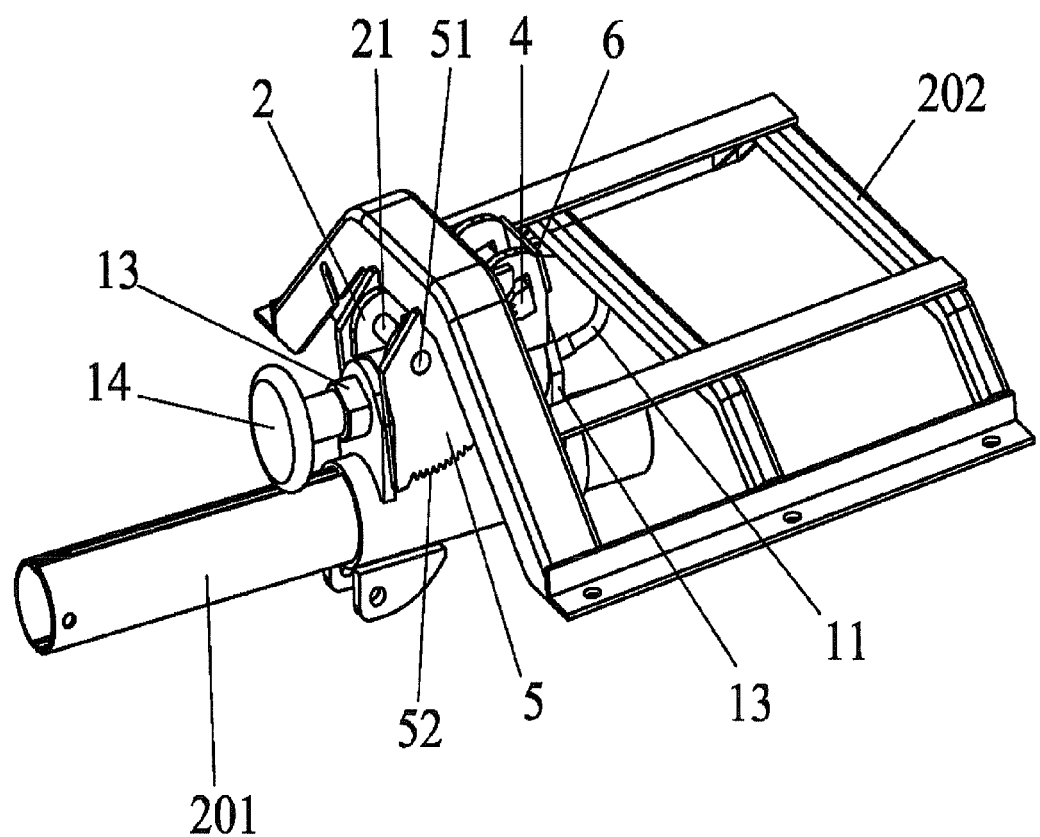
FIG. 8 shows a perspective view of the frame folding and adjustment mechanism after the frame is folded according to one embodiment of the present invention.
Figure 9:
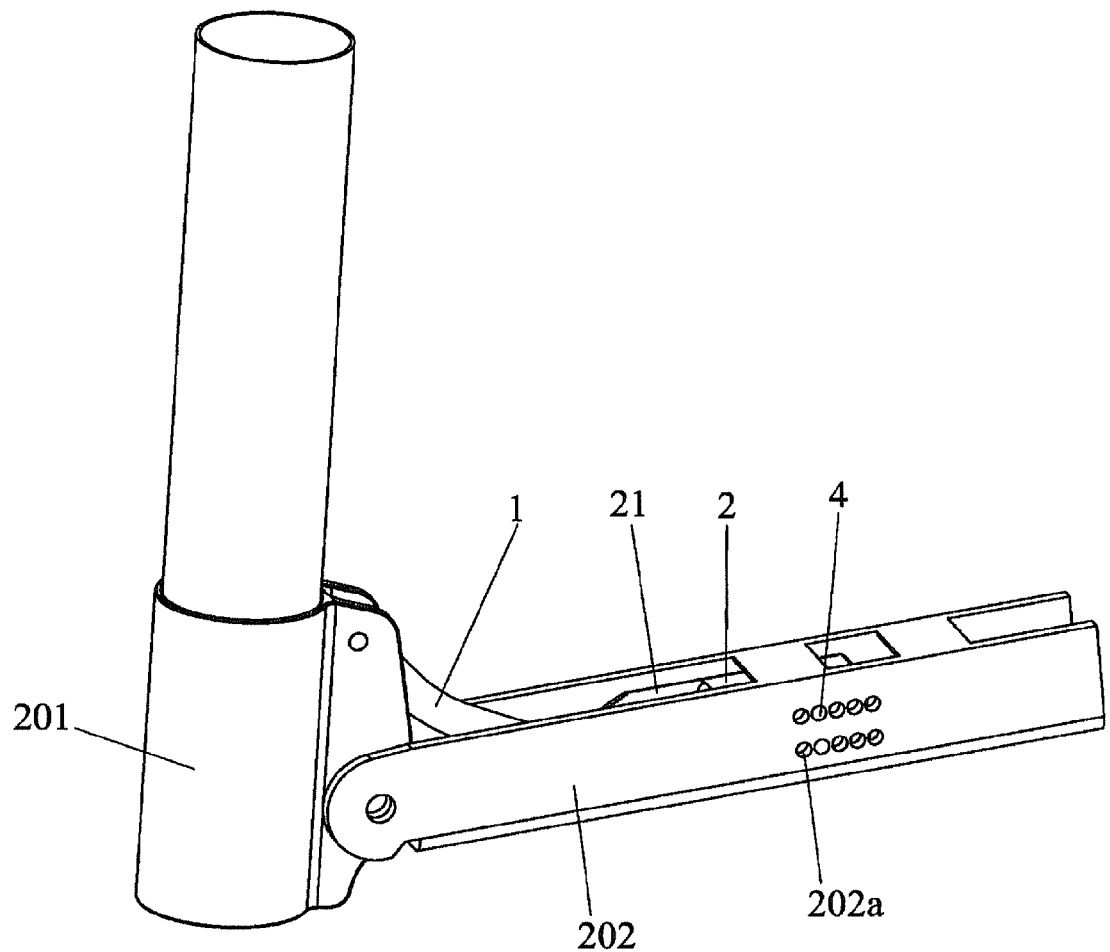
FIG. 9 is an perspective view of another frame folding and adjustment mechanism according to one embodiment of the present invention.
Figure 10:
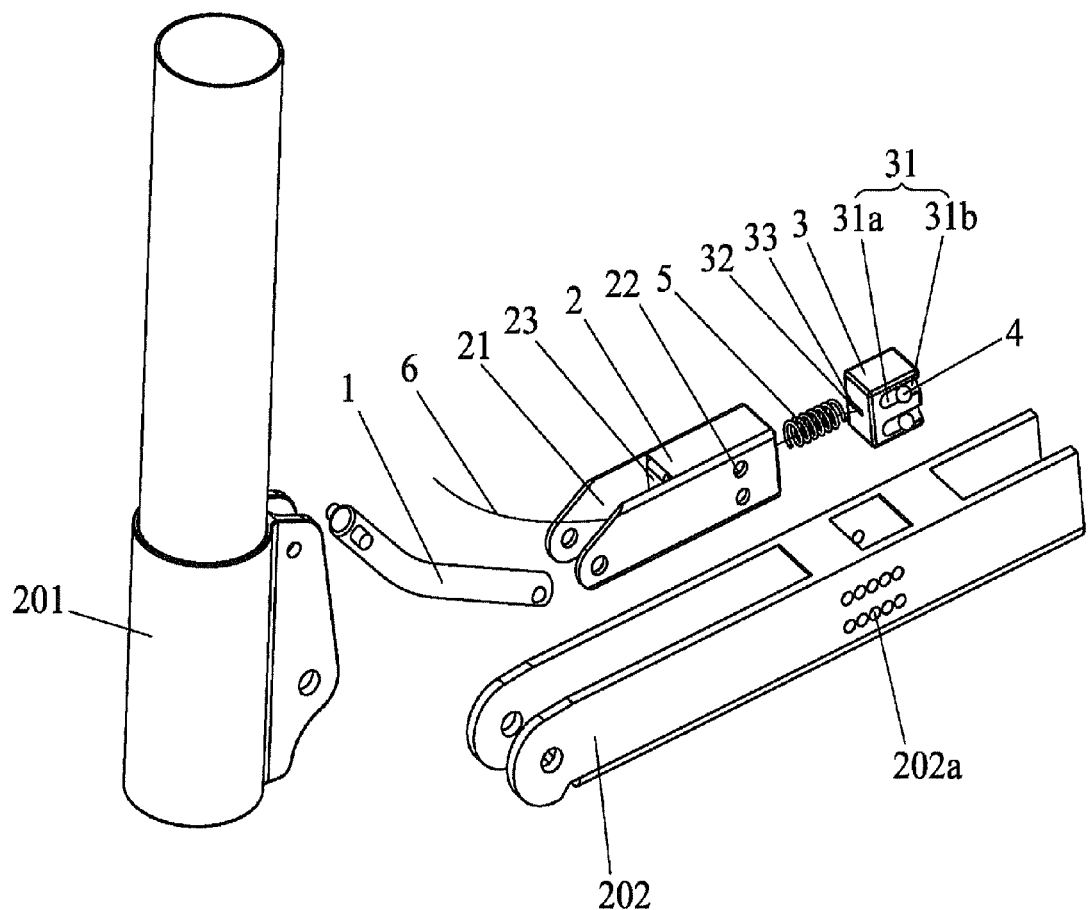
FIG. 10 is an exploded perspective view of the frame folding mechanism according to one embodiment of the present invention.
Figure 11:
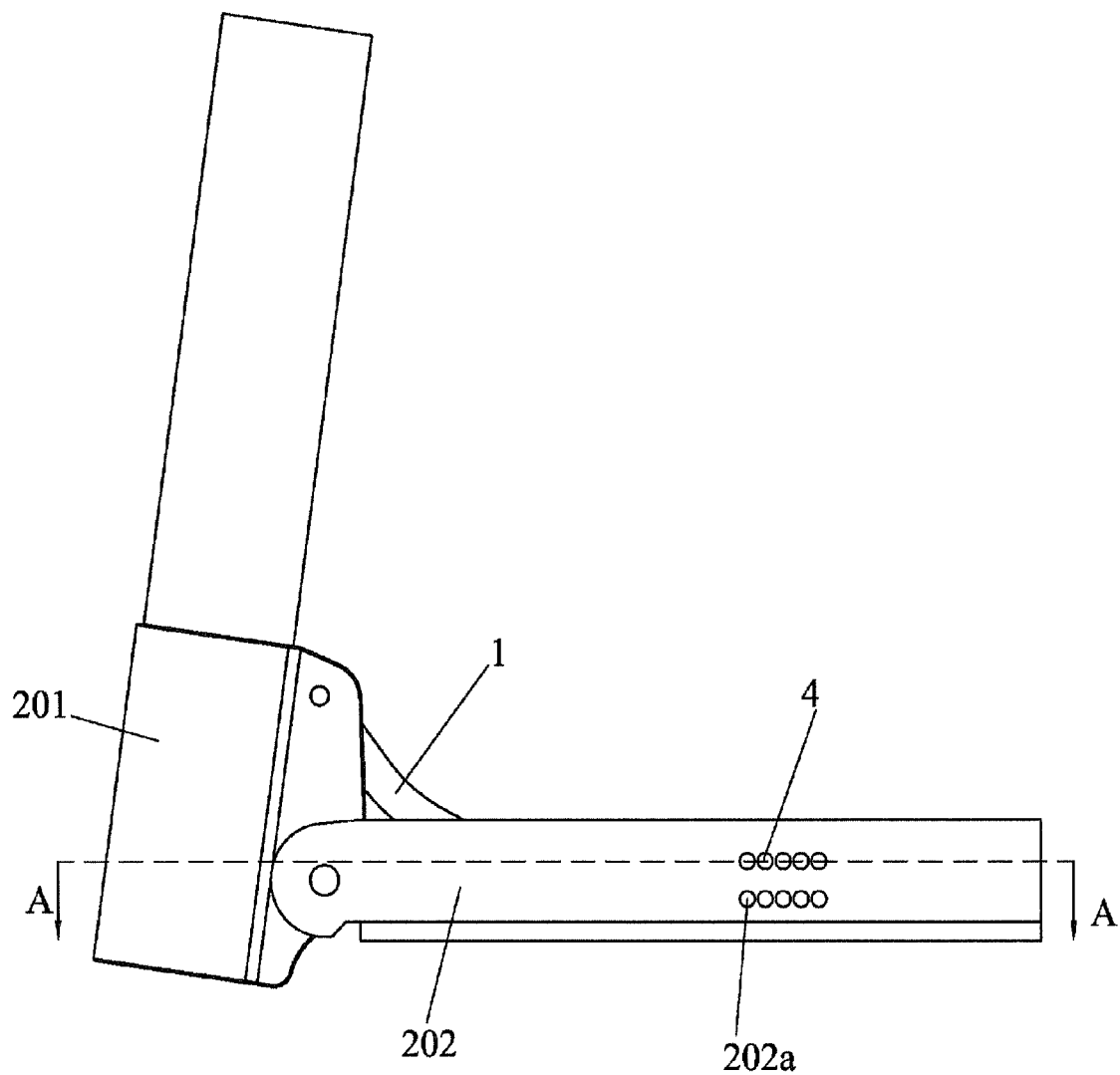
FIG. 11 is a side view of locked steel balls of the frame folding and adjustment mechanism according to one embodiment of the present invention.

With reference to the above description as well as FIG. 6, FIG. 7 and FIG. 8, in use, the tension spring 3 contracts and tightens the cable 11 upwards. The cable 11 tightens the restricting member 4 towards the hollow adjusting and fixing member 5, so that the locking teeth 41 engage with the adjusting teeth 52, thereby locking the front rack 201 at a certain angle. When the angle of the front rack 201 needs to be adjusted, the connecting handle 14 is pulled, so that the cable 11 draws the restricting member 4 through the guide pipe 13 and the restricting plate 6, and the restricting member 4 moves downwards in the slide slot 22. Meanwhile, the cable 11 draws the tension spring 3, and the locking teeth 41 detach from the adjusting teeth 52. In this process, the restricting member 4 is restricted by the slide slot 22, and is always at a position on the slide slot 22. When the locking teeth 41 completely detach from the adjusting teeth 52, the front rack 201 is in an unlocked state. Then, the front rack 201 is rotated about the pivot shaft 21 to adjust the front rack 201 to a proper angle. At this time, the connecting handle 14 is released, and the restricting member 4 moves towards the hollow adjusting and fixing member 5 under a tensile force of the tension spring 3. When the locking teeth 41 engage with the adjusting teeth 52, the rotation of the front rack 201 is restricted, so that the front rack 201 is locked, thereby completing the adjustment. When the front rack 201 needs to be completely folded and locked, the cable 11 is drawn to enable the locking teeth 41 of the restricting member 4 to detach from the adjusting teeth 52, so that the front rack 201 is in the unlocked state. Then, the front rack 201 is directly rotated downwards till the restricting member 4 is aligned with the position of the restricting slot 53. Then, the cable 11 is released, and the tension spring 3 draws the restricting member 4 to enable the restricting member 4 to be fastened in the restricting slot 53.

In one embodiment, the hollow adjusting and fixing member 5 is fixedly disposed on the body rack 202, the arc-shaped edge of the hollow adjusting and fixing member 5 is formed with the adjusting teeth 52, the restricting member 4 is formed with the locking teeth 41, and the restricting member 4 is enabled to slide in the slide slot 22 through the elastic action of the tension spring 3 and the stretching action of the cable 11, so that the adjusting teeth 52 engage with or detach from the locking teeth 41, thereby locking or unlocking the front rack 201. Moreover, by rotating the hollow mounting member 2, the locking teeth 41 of the restricting member 4 engage with different adjusting teeth 52, so as to set the front rack 201 at different angles, thereby achieving angle adjustment. Furthermore, as the hollow adjusting and fixing member 5 is formed with the restricting slot 53, the front rack 201 enters a locked state after being completely folded once the restricting member 4 is fastened in the restricting slot 53. The whole the frame folding and adjustment mechanism 100 can adjust and lock the front rack 201 simply by controlling the cable 11, and the front rack 201 is received in the bottom portion of the body rack 202 after being folded. The present invention has a simple, compact structure and is convenient in operation.

The structures of the front rack 201 and the body rack 202 involved in the frame folding and adjustment mechanism 100 according to the present invention are well known to those of ordinary skill in the art, and thus will not be illustrated in detail herein. FIG. 8 shows the frame folding and adjustment mechanism 100 when it is folded, according to one embodiment of the present invention.

In another aspect, the present invention relates to a frame folding and adjustment mechanism 100 as shown in FIG. 9 to FIG. 14. The frame folding and adjustment mechanism 100 is mounted between a front rack 201 and a body rack 202 of a foldable motorized vehicle to enable the front rack 201 to be adjustable and foldable relative to the body rack 202. In one embodiment, the frame folding and adjustment mechanism 100 includes: (a) a connecting member 2, (b) a connecting rod 1, (c) a sliding block 3, (d) two steel balls 4, (e) a spring 5, and (f) a cable 6.

In one embodiment, the connecting member 2 is hollow and slidingly mounted in the body rack 202. The connecting member 2 is opened with through holes 22 on each side of two side walls. The body rack 202 is provided with locking holes 202a corresponding to the through holes on both sides. The connecting rod 1 has two ends. The first end is pivoted to the front rack 201, and the second end is pivoted to the connecting member 2. The sliding block 3 is slidingly mounted in the connecting member 2. The sliding block 3 is provided with step-like accommodation slots 31 corresponding to the through holes 22 respectively on each of the two sides. The sliding block 3 also has a cable slit 33 along a front direction of the front rack 201, and a connecting hole 32 in communication with the cable slit 33. The two steel balls 4, one on each side, are accommodated in the accommodation slot 31. The other side passing through the through holes 22 and is engaged with the locking hole 202a. The spring 5 presses between a pressing plate 23 of the connecting member 2 and the sliding block 3. The cable 6 has two ends. The first end is inserted in the connecting hole 32 and clamped in the cable slit 33 such that it is connected to the sliding block 3. The second end passes through the cable slit 33 and the spring 5 and is connected to a cable controller (not shown in the drawing) of a handle of the foldable motorized vehicle.

In one embodiment, the connecting member 2 has two connecting pieces 21 extended at two sides along a direction of the front rack 201. The connecting pieces 21 are pivoted to the connecting rod 1. The accommodation slot 31 has an arc-shaped cross section. The through holes 22 are arranged longitudinally. The locking holes 202a are arranged in two parallel rows corresponding to the through holes 22. The connecting hole 32 of the sliding block 3 is in communication with the cable slit 33. The head of the cable 6 is inserted in the connecting hole 32 and clamped in the cable slit 33.

Figure 12:
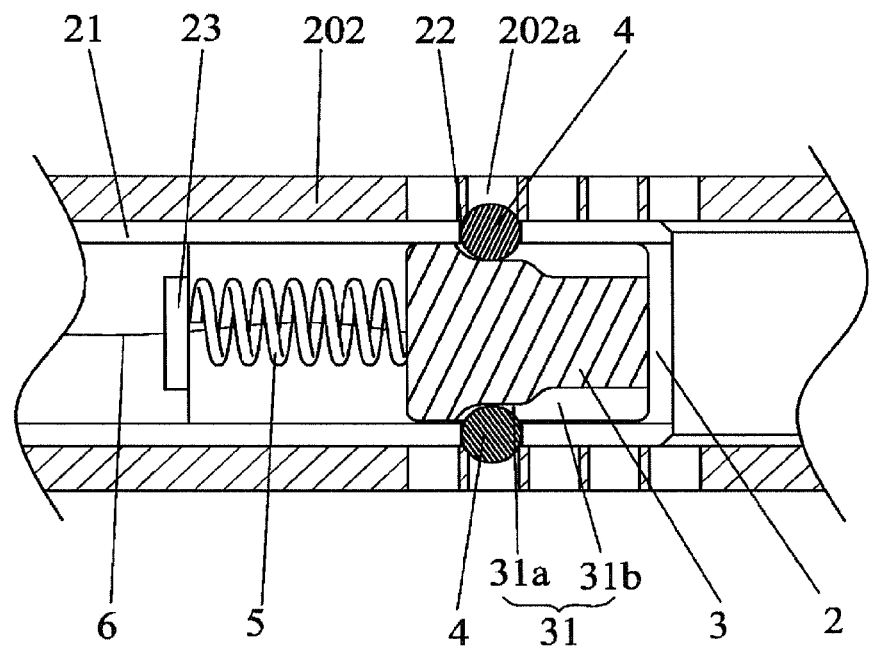
FIG. 12 is a sectional view of locked steel balls of the frame folding and adjustment mechanism along an A-A direction as shown in FIG. 11 according to one embodiment of the present invention.
Figure 13:
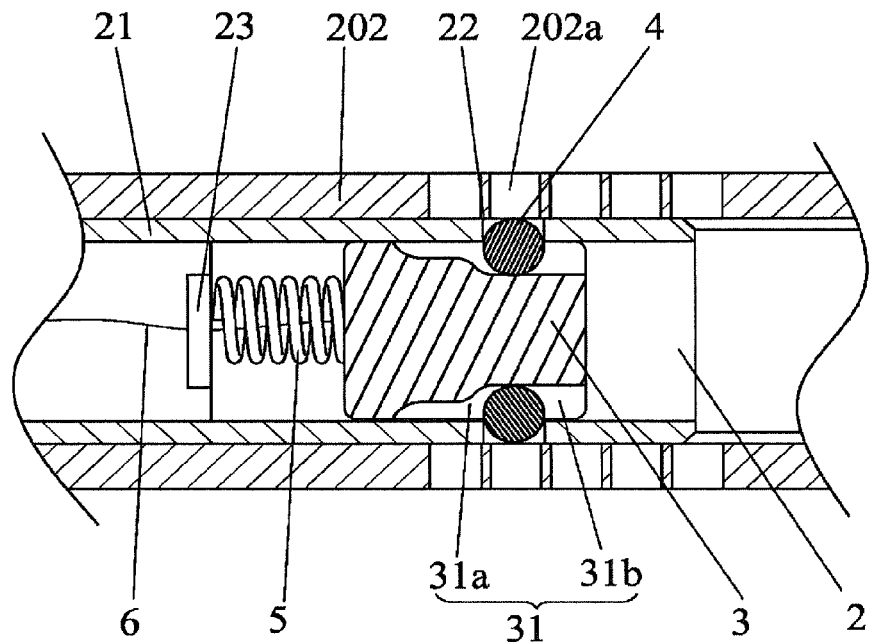
FIG. 13 is a sectional view of unlocked steel balls of the frame folding and adjustment mechanism along an A-A direction as shown in FIG. 11 according to one embodiment of the present invention.
Figure 14:
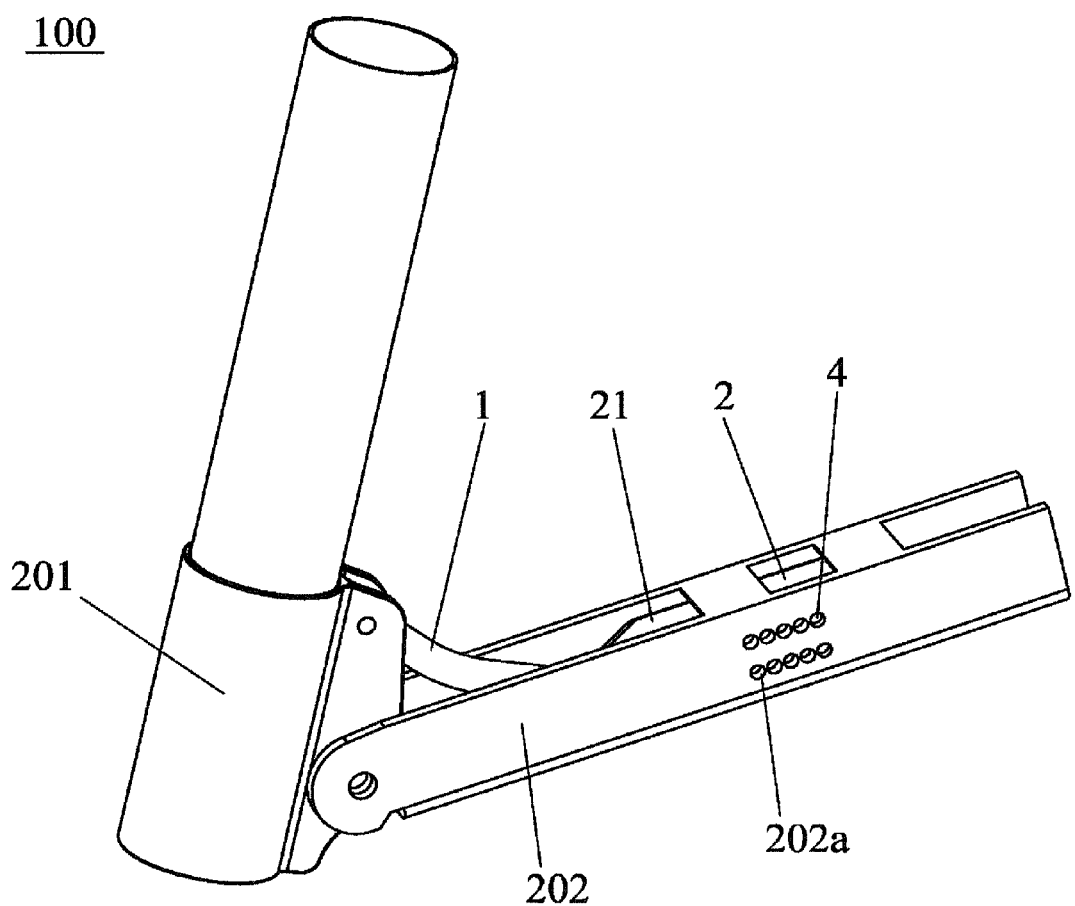
FIG. 14 is a perspective view of the folding frame adjustment mechanism after angle adjustment according to one embodiment of the present invention.

In view of the above and referring to FIG. 12 and FIG. 13, when the frame folding and adjustment mechanism 100 is used, the cable 6 is tightened, the spring 5 is compressed to fix the sliding block 3, the steel balls 4 are accommodated in the shallow slot 31a, and then the steel balls 4 pass through the through holes 22 and protrude into the locking holes 202a, so as to fix the front rack 201 at a certain angle. When the angle of the front rack 201 needs to be adjusted, the cable controller is used to facilitate the control. The cable 6 draws the sliding block 3, the sliding block 3 moves forwards and compresses the spring 5, and the accommodation slot 31 moves forwards along with the sliding block 3. In this process, the steel balls 4 are limited by the accommodation slots 31 and the through holes 22, and are located at positions corresponding to the through holes 22. When the deep slot 31b is aligned with the steel balls 4, the steel balls 4 exit the locking holes 202a, and are located between the through holes 22 and the deep slot 31b, and at this time, the front rack 201 is unlocked. Thereafter, the angle of the front rack 201 is adjusted.

The front rack 201 drives the connecting rod 1 to move backwards, so as to push the connecting member 2 to move backwards, so that the through holes 22 of the connecting member 2 are aligned with the locking holes 202a of the body rack 202. At this point, the cable 6 is released, the sliding block 3 moves backwards under the elasticity of the spring 5, the accommodation slots 31 move backwards along with the sliding block 3, and when the shallow slot 31a is aligned with the steel balls 4, the steel balls 4 are forced to pass through the through holes 22 and protrude into the locking holes 202a, thereby limiting the connecting member 2 from moving backwards, and locking the front rack 201. Therefore, the adjustment is completed. When it is intended to completely fold the front rack 201, the sliding block 3 is drawn so that the steel balls 4 are located in the deep slot 31b. Therefore, the front rack 201 is unlocked, and the front rack 201 is rotated downwards directly until being folded. The working principle is the same as that of angle adjustment, and is not described again herein.

Compared with the prior art, in the present invention, the connecting rod 1 drives the connecting member 2 so that the connecting member 2 slides with respect to the body rack 202, and the steel balls 4 mounted in the connecting member 2 are engaged with the locking holes 202a in the body rack 202. Therefore, the steel balls 4 are engaged in different locking holes 202a such that the front rack 201 can be locked at different angles, thereby realizing the angle adjustment of the front rack 201. Moreover, through the driving of the cable 6 and the elasticity of the spring 5, the sliding block 3 is enabled to slide inside the connecting member 2, thereby impelling the steel balls 4 to be accommodated in the step-like accommodation slots 31, so that the steel balls 4 can protrude into or exit the locking holes 202a, so as to realize locking or unlocking of the front rack 201. The whole adjustment mechanism has a simple structure, and it is only necessary to control the cable 6 to realize the adjustment and locking of the front rack 201, which is quite simple and convenient in operation. Moreover, the whole mechanism is accommodated in the body rack 202, so the appearance of the whole foldable motorized vehicle is not affected.

The working principle of the cable controller involved in the folding frame adjustment mechanism 100 according to the present invention is well known to those of ordinary skill in the art, and is not illustrated in detail.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A frame folding and adjustment mechanism, mounted between a front rack and a body rack of a foldable motorized vehicle to enable the front rack to be adjustable and foldable relative to the body rack, comprising:
    (a) a hollow adjusting and fixing member, mounted to the body rack, having two pivot holes, one on each side;
    (b) a hollow mounting member, wherein an upper end of the hollow mounting member is disposed in the hollow adjusting and fixing member and is pivoted through the pivot holes to the hollow adjusting and fixing member, and a lower end of the hollow mounting member is formed with one slide slot on each side;
    (c) an elastic element, mounted on the hollow mounting member;
    (d) a restricting member, vertically slideably mounted in the two slide slots on each side and engaging with the edges of the hollow adjusting and fixing member; and
    (e) a cable assembly, comprising a fixing cylinder, and a cable, wherein the fixing cylinder is fixed between the front rack and the hollow mounting member, an upper end of the cable freely passes through the fixing cylinder, a lower end of the cable fixedly passes through the restricting member and is connected to a lower end of the elastic element, an upper end of the elastic element is fixed to the hollow mounting member, the restricting member detaches from the hollow adjusting and fixing member when the upper end of the cable is pulled, and the restricting member engages with the edges of the hollow adjusting and fixing member when the upper end of the cable is released.

2. The frame folding and adjustment mechanism according to claim 1, wherein the cable assembly further comprises a guide pipe, and a connecting handle, the guide pipe is inserted and fixed in the fixing cylinder, the upper end of the cable freely passes through the guide pipe and is fixedly connected to the connecting handle, and the connecting handle is mounted above the guide pipe.

3. The frame folding and adjustment mechanism according to claim 2, wherein the hollow mounting member comprises a pivot shaft, the pivot shaft is fixed to the upper end of the hollow mounting member and is mounted in the pivot holes, and the upper end of the elastic element is connected to the pivot shaft.

4. The frame folding and adjustment mechanism according to claim 3, wherein the elastic element is a tension spring.

5. The frame folding and adjustment mechanism according to claim 4, wherein the frame folding and adjustment mechanism further comprises a cable restricting plate, the cable restricting plate is fixed to a bottom portion of the lower end of the hollow mounting member, a middle portion of the cable restricting plate is formed with a restricting hole for the cable to pass through, and the restricting hole is aligned with the axis of the elastic element.

6. The frame folding and adjustment mechanism according to claim 5, wherein the hollow adjusting and fixing member has a fan-shaped structure.

7. The frame folding and adjustment mechanism according to claim 6, wherein an upper surface of the restricting member is formed with locking teeth, and an arc-shaped edge of the fan-shaped structure of the hollow adjusting and fixing member is formed with adjusting teeth engaging with the locking teeth.

8. The frame folding and adjustment mechanism according to claim 7, wherein a left end of the arc-shaped edge of the fan-shaped structure of the hollow adjusting and fixing member is formed with a restricting slot for fastening the restricting member.

9. The frame folding and adjustment mechanism according to claim 8, wherein the hollow adjusting and fixing member has a fan-shaped angle about 90°.

10. A foldable motorized vehicle, comprising:
    a front rack;
    a body rack; and
    a frame folding and adjustment mechanism, mounted between the front rack and the body rack to enable the front rack to be adjustable and foldable relative to the body rack, the frame folding and adjustment mechanism comprising:
    (a) a hollow adjusting and fixing member, mounted to the body rack, having two pivot holes, one on each side;

(b) a hollow mounting member, wherein an upper end of the hollow mounting member is disposed in the hollow adjusting and fixing member and is pivoted through the pivot holes to the hollow adjusting and fixing member, and a lower end of the hollow mounting member is formed with one slide slot on each side;

(c) an elastic element, mounted on the hollow mounting member;

(d) a restricting member, vertically slideably mounted in the two slide slots on each side and engaging with the edges of the hollow adjusting and fixing member; and (e) a cable assembly, comprising a fixing cylinder, and a cable, wherein the fixing cylinder is fixed between the front rack and the hollow mounting member, an upper end of the cable freely passes through the fixing cylinder, a lower end of the cable fixedly passes through the restricting member and is connected to a lower end of the elastic element, an upper end of the elastic element is fixed to the hollow mounting member, the restricting member detaches from the hollow adjusting and fixing member when the upper end of the cable is pulled, and the restricting member engages with the edges of the hollow adjusting and fixing member when the upper end of the cable is released.

* * * * *